United States Patent
Liu

(10) Patent No.: US 11,068,724 B2
(45) Date of Patent: Jul. 20, 2021

(54) DEEP LEARNING CONTINUOUS LANE LINES DETECTION SYSTEM FOR AUTONOMOUS VEHICLES

(71) Applicant: Baidu USA LLC, Sunnyvale, CA (US)

(72) Inventor: Xiaoshu Liu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 132 days.

(21) Appl. No.: 16/158,256

(22) Filed: Oct. 11, 2018

(65) Prior Publication Data

US 2020/0117916 A1  Apr. 16, 2020

(51) Int. Cl.
| | |
|---|---|
| G06K 9/62 | (2006.01) |
| G06K 9/00 | (2006.01) |
| G06N 3/08 | (2006.01) |
| G05D 1/02 | (2020.01) |
| G06N 3/04 | (2006.01) |

(52) U.S. Cl.
CPC ....... *G06K 9/00798* (2013.01); *G05D 1/0221* (2013.01); *G05D 1/0246* (2013.01); *G06N 3/0454* (2013.01); *G06N 3/08* (2013.01); *G05D 2201/0213* (2013.01)

(58) Field of Classification Search
CPC .................................................. G06K 9/00798
See application file for complete search history.

(56) References Cited

U.S. PATENT DOCUMENTS

| | | | | |
|---|---|---|---|---|
| 7,379,815 B2 * | 5/2008 | Kobayashi | ........... | G05D 1/0246 701/300 |
| 8,364,334 B2 * | 1/2013 | Au | ...... | G05D 1/0278 701/23 |
| 8,521,352 B1 * | 8/2013 | Ferguson | ........... | G05D 1/0212 701/25 |
| 8,825,265 B1 * | 9/2014 | Ferguson | ........... | G05D 1/0214 701/26 |
| 8,996,224 B1 * | 3/2015 | Herbach | ........... | G05D 1/0044 701/23 |

(Continued)

FOREIGN PATENT DOCUMENTS

WO  WO-2017020528 A1 * 2/2017 ........... G06K 9/6257

OTHER PUBLICATIONS

Predicting Future Lane Changes of Other Highway Vehicles using RNN-based Deep Models, Sajan Patel et al., arXiv:1801.04340v1 [cs.RO] Jan. 12, 2018, pp. 1-7 (Year: 2018).*

(Continued)

*Primary Examiner* — Jayesh A Patel
(74) *Attorney, Agent, or Firm* — Womble Bond Dickinson (US) LLP

(57) ABSTRACT

According to an embodiment, a system receives a captured image perceiving one or more lane markers surrounding the ADV from an image capturing device of the ADV. The system detects one or more continuous lane lines based on the one or more lane markers in the captured image by applying a machine learning model to the captured image, where the machine learning model includes a number of layers of nodes and the machine learning model includes a weighted softmax cross-entropy loss within at least one of the layers in training. The system generates a trajectory based on the one or more continuous (e.g., whole) lane lines to control the ADV autonomously according to the trajectory.

20 Claims, 13 Drawing Sheets

(56) References Cited

U.S. PATENT DOCUMENTS

| | | | | |
|---|---|---|---|---|
| 9,150,220 | B2* | 10/2015 | Clarke | B60W 40/06 |
| 9,230,183 | B2* | 1/2016 | Bechtel | B60R 1/04 |
| 9,902,403 | B2* | 2/2018 | Donnelly | G06F 3/0346 |
| 10,789,487 | B2* | 9/2020 | Mittal | G01C 21/32 |
| 2007/0198146 | A1* | 8/2007 | Ikeda | H04N 7/18 |
| | | | | 701/23 |
| 2010/0014714 | A1* | 1/2010 | Zhang | G06K 9/00798 |
| | | | | 382/104 |
| 2013/0266175 | A1* | 10/2013 | Zhang | G06T 7/181 |
| | | | | 382/103 |
| 2015/0339928 | A1* | 11/2015 | Ramanujam | G06Q 50/30 |
| | | | | 701/23 |
| 2016/0048733 | A1* | 2/2016 | Jung | G06K 9/00798 |
| | | | | 382/104 |
| 2016/0125608 | A1* | 5/2016 | Sorstedt | B60R 1/00 |
| | | | | 348/148 |
| 2016/0129908 | A1* | 5/2016 | Harda | G05D 1/0088 |
| | | | | 701/24 |
| 2016/0167582 | A1* | 6/2016 | Chen | G01C 21/32 |
| | | | | 348/148 |
| 2017/0101080 | A1* | 4/2017 | Brannstrom | B60T 7/12 |
| 2017/0113702 | A1* | 4/2017 | Thieberger-Navon | |
| | | | | B60W 50/0097 |
| 2017/0132916 | A1* | 5/2017 | Ioli | G08G 1/091 |
| 2017/0190331 | A1* | 7/2017 | Gupta | G07C 5/02 |
| 2017/0293811 | A1* | 10/2017 | Zhai | G06K 9/46 |
| 2017/0300763 | A1* | 10/2017 | Zou | G06K 9/6271 |
| 2017/0330043 | A1* | 11/2017 | Shih | H04N 7/183 |
| 2018/0089563 | A1* | 3/2018 | Redding | G05D 1/0088 |
| 2018/0107215 | A1* | 4/2018 | Djuric | G06N 3/04 |
| 2018/0373941 | A1* | 12/2018 | Kwant | G08G 1/0129 |
| 2019/0092326 | A1* | 3/2019 | Honda | B60W 40/064 |
| 2019/0102692 | A1* | 4/2019 | Kwant | G06N 20/00 |
| 2019/0156128 | A1* | 5/2019 | Zhang | G08G 1/167 |
| 2019/0176660 | A1* | 6/2019 | Xiao | B60R 11/0235 |
| 2019/0180115 | A1* | 6/2019 | Zou | G06N 3/0454 |
| 2019/0188538 | A1* | 6/2019 | Kwant | G06K 9/6262 |
| 2019/0205664 | A1* | 7/2019 | Duan | G06T 7/74 |
| 2019/0235520 | A1* | 8/2019 | Parchami | G05D 1/0251 |
| 2019/0272389 | A1* | 9/2019 | Viente | G05D 1/0253 |
| 2019/0354786 | A1* | 11/2019 | Lee | G06N 7/005 |
| 2020/0026960 | A1* | 1/2020 | Park | G06K 9/6218 |
| 2020/0104607 | A1* | 4/2020 | Kim | G06T 7/70 |

OTHER PUBLICATIONS

The Automated Learning of Deep Features for Breast Mass Classification from Mammograms, Neeraj Dhungel et al., Springer, DOI: 10.1007/978-3-319-46723-8 13, 2016, pp. 106-114 (Year: 2016).*

ICNet for Real-Time Semantic Segmentation on High-Resolution Images, Hengshuang Zhao et al., The European Conference on Computer Vision (ECCV), 2018, pp. 405-420 (Year: 2018).*

An End-to-End Neural Network for Road Extraction From Remote Sensing Imagery by Multiple Feature Pyramid Network, Xun Gao et al., 2169-3536, 2018, pp. 39401-39414 (Year: 2018).*

Robust lane detection—concensus, Jihun Kim et al., Springer, 2014, pp. 454-461 (Year: 2014).*

Deep Neural networks—Scene, Jun Li et al., IEEE, 2162-237X, 2016, pp. 690-703 (Year: 2016).*

Accurate and robust lane—Neural Network., Bei He et al., IEEE, 2016, pp. 1041-1046 (Year: 2016).*

Large-Margin Softmax Loss for Convolutional Neural Networks, Weiyang Liu et al., 2016, pp. 1-10 (Year: 2016).*

* cited by examiner

11,068,724 B2

DEEP LEARNING CONTINUOUS LANE LINES DETECTION SYSTEM FOR AUTONOMOUS VEHICLES

TECHNICAL FIELD

Embodiments of the present disclosure relate generally to operating autonomous vehicles. More particularly, embodiments of the disclosure relate to a deep learning continuous (e.g., whole) lane lines detection system for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Image segmentation models can be used to detect lane lines. In computer imaging, image segmentation is a process of partitioning or grouping a digital image into segments of pixels to be more meaningful for analysis. Tradition feature-based image segmentation cannot detect a whole lane line and a length of a predicted lane may be too short further analysis. In addition, feature-based image segmentation may fail to detect some lane lines.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
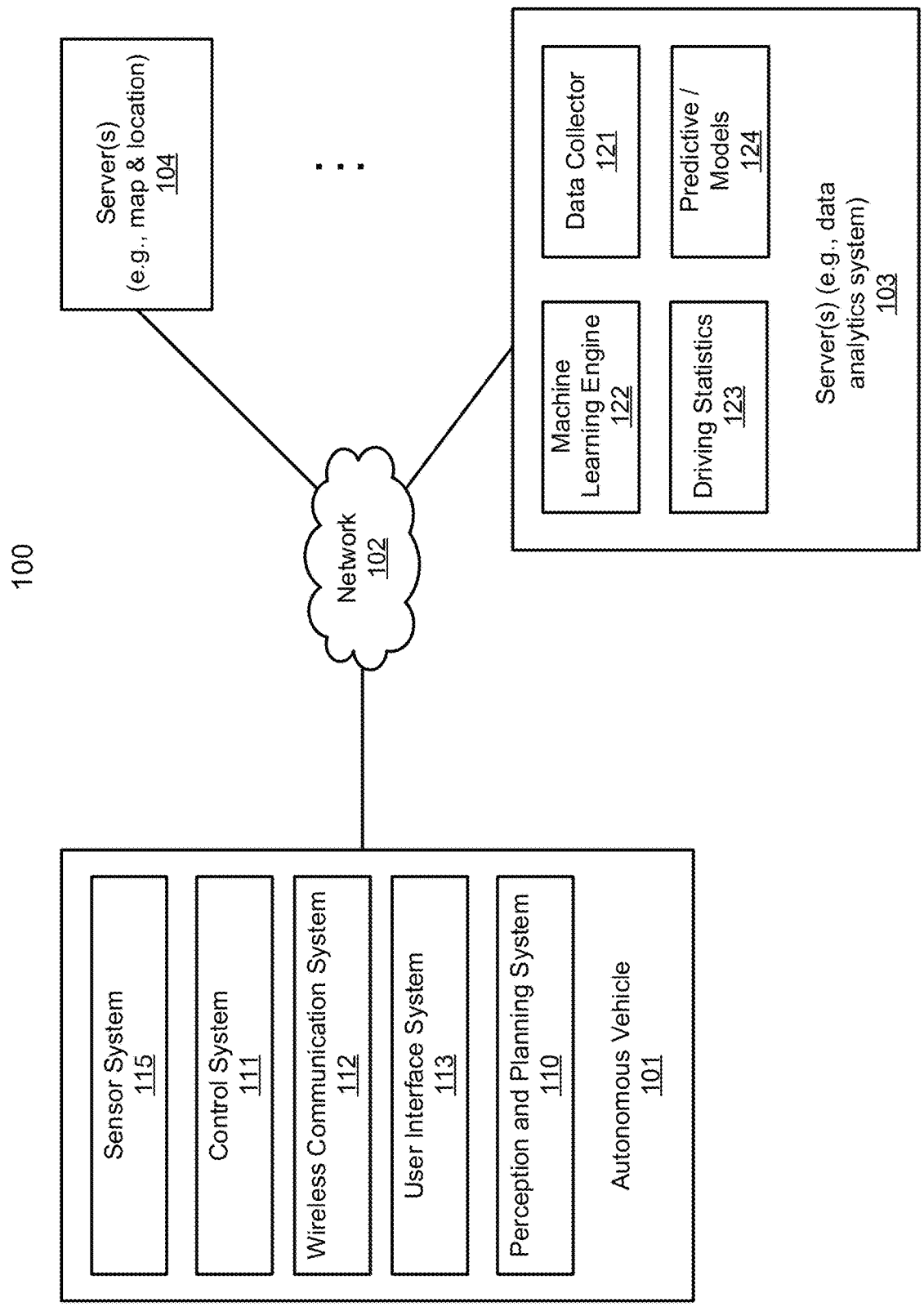
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosures disclose a deep learning image segmentation system for an ADV to detect whole lane lines. According to one aspect, a system receives a captured image perceiving one or more lane markers surrounding the ADV from an image capturing device of the ADV. The system detects one or more continuous lane lines based on the one or more lane markers (e.g., painted roadway dashed lane markers, botts' dots, raised pavement markers, reflective pavement markers, division lines between new and old roads curbs, or a combination thereof) in the captured image by applying a machine learning model to the captured image, where the machine learning model includes a number of layers of nodes and the machine learning model includes a weighted softmax cross-entropy loss within at least one of the layers in training. The system generates a trajectory based on the one or more continuous (e.g., whole) lane lines to control the ADV autonomously according to the trajectory.

According to a second aspect, a system selects a set of training images to train the machine learning model, where the machine learning model includes a number of layers of nodes and a weighted softmax cross-entropy loss within at least one of the layers. For each of the training images, the system identifies one or more continuous lane lines based on one or more lane markers in the image, generates a number of labels by connecting the lane markers corresponding to the identified continuous lane lines, determines a ratio of pixels count for pixels of the continuous lane lines to a total pixels count of the image, and determines a weighting function for the weighted softmax cross-entropy loss based on the determined ratio. The system trains the machine learning model based on the set of training images using the generated labels and the weighted softmax cross-entropy loss, where the trained machine learning model is applied to an image perceiving an environment surrounding the ADV captured by an image capturing device of the ADV to identify one or more continuous lane lines based on the lane markers captured in the image, where the continuous lane lines are used to generate a trajectory to control the ADV autonomously according to the trajectory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle communication standard designed to allow microcontrollers and devices to communicate with each other in applications without a host computer. It is a message-based protocol, designed originally for multiplex electrical wiring within automobiles, but is also used in many other contexts.

Figure 2:
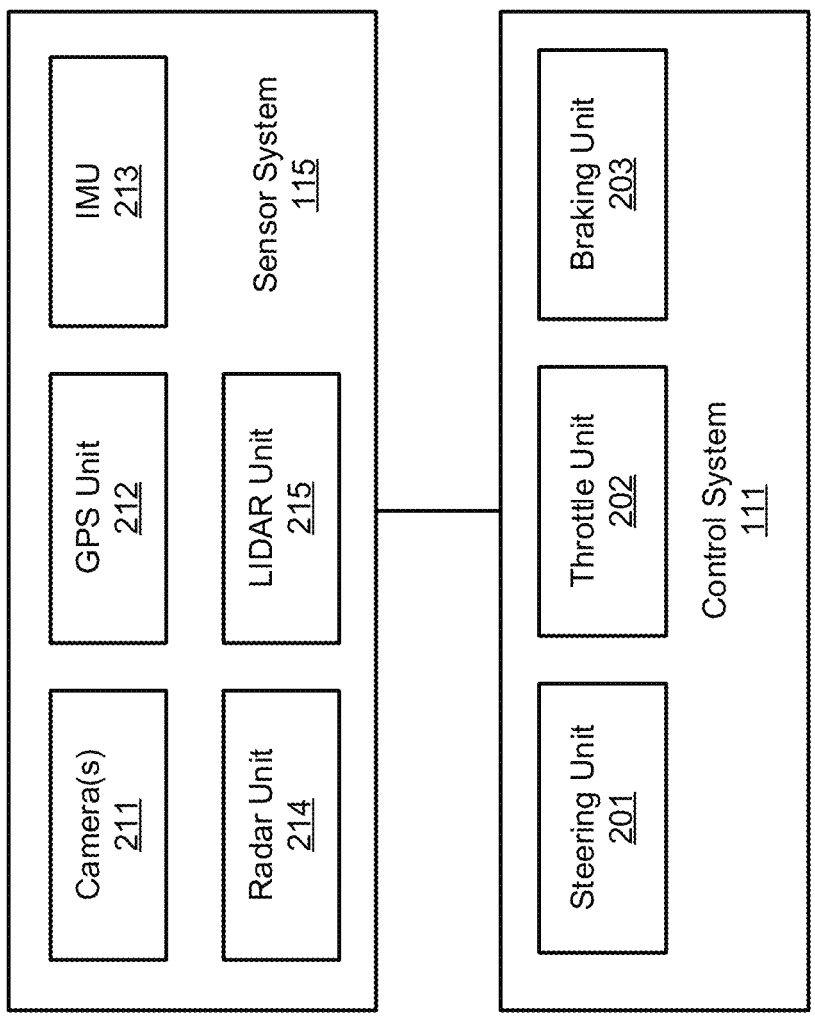
FIG. 2 is a block diagram illustrating an example of a sensor and control system using by an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be stationary cameras and/or PTZ (pan-tilt-zoom) cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor (e.g., electric power steering (EPS)) may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

Vehicle control system 111 can include, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or models 124 for a variety of purposes. In one embodiment, for example, algorithms/model 124 may include one or more machine learning models to detect lane lines and/or objects. The machine learning models can be trained and uploaded onto ADVs to be used for autonomous driving by the ADVs, in real-time.

Figure 3A:
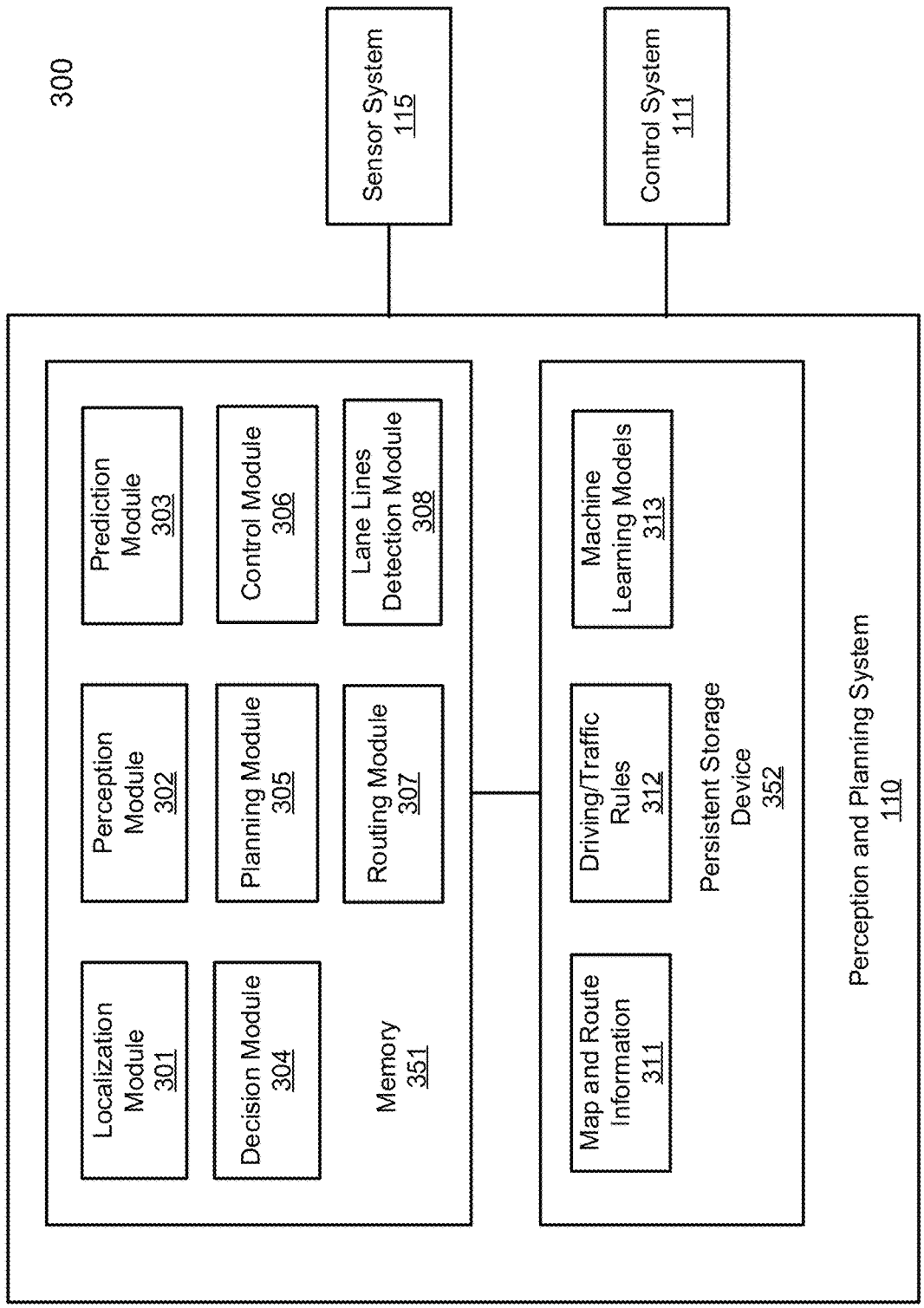
FIGS. 3A-3B are block diagrams illustrating examples of a perception and planning system used by an autonomous vehicle according to some embodiments.
Figure 3B:
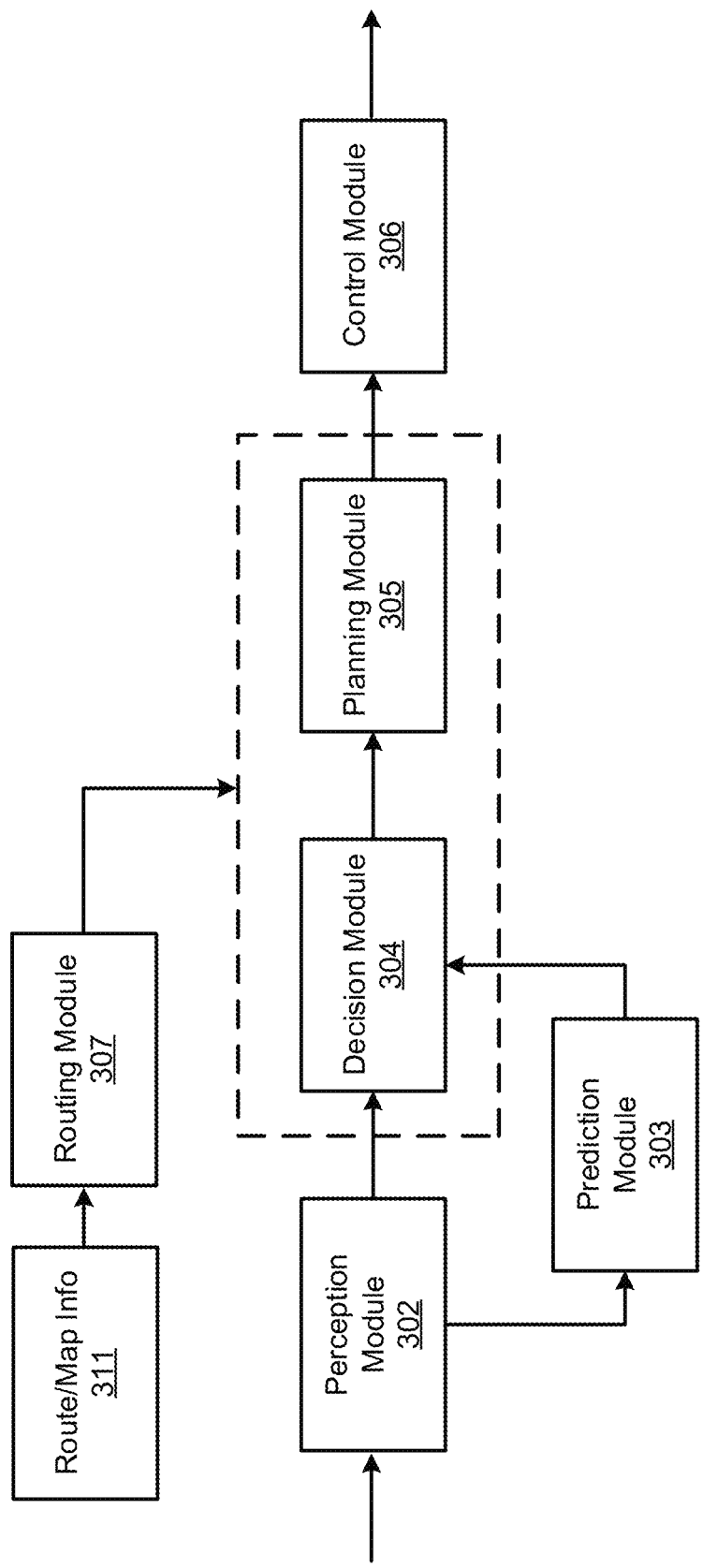

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing/sampling module 307, and lane lines detection module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, lane lines detection module 308 and perception module 302 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
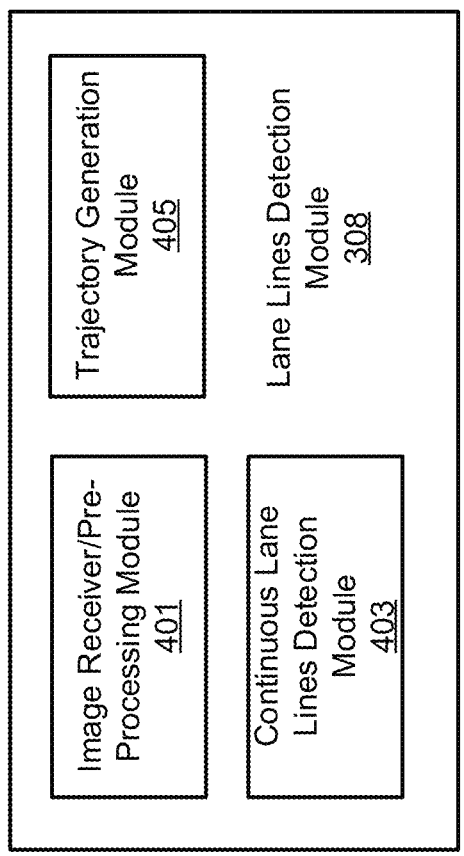
FIG. 4 is a block diagram illustrating an example of a lane/object tracking module according to one embodiment.

FIG. 4 is a block diagram illustrating an example of a lane lines detection module according to one embodiment. Referring to FIG. 4, lane lines detection module 308 can detect and track continuous whole lane lines by applying one or more machine learning models to images capturing roadway lane markers by an image capturing device (e.g., camera sensor) of the ADV. Lane lines detection module 308 can then generate a driving trajectory for the ADV based on the continuous whole lane lines. In one embodiment, lane lines detection module 308 includes image receiver/pre-processing module 401, continuous lane lines detection module 403, and trajectory generation module 405. Image receiver/pre-processing module 401 can receive an image captured by an image capturing device (e.g., one or more cameras) of the ADV. Image receiver module 401 can also pre-process the images. Pre-processing can include, but is not limited to, adjusting an exposure control, a gain control, a tone mapping, white balancing, and demosaic & bilateral filtering to be applied to the image. Pre-processing the images prepares the images to better identify objects (e.g., traffic lights, pedestrians) and/or lane lines captured in the images with varying time of day and weather conditions. For example, at night time, there should be a higher amount of light exposure in an image than at day time, such that objects and/or lane lines can be better identified. Another example of pre-processing includes scaling and/or cropping the images to an image size compatible with the machine learning model to be applied. Continuous lane lines detection module 403 can apply a machine learning model (as part of machine learning models 313) to the received image to identify/detect continuous lane lines. Here, the machine learning model can be a deep learning convolutional neural network (CNN) trained to detect continuous (whole) lane lines based on dashed, dot, raised, or reflective lane markers in the received image. Trajectory generation module 405 can generate a trajectory to control the ADV, where the trajectory is generated based on, among any perceived objects, the detected continuous lane lines.

Note, the machine learning model may include, but is not limited to, neural networks (fully connected, partially connected, or a combination thereof), support vector machines (SVM), linear regression, k-nearest neighbors, naive bayes, k-means, and random forest models. A neural network is a machine learning model which can learn to perform tasks by considering examples (e.g., training with input/output scenarios), without being programmed with any task-specific rules. A neural network is a computational approach based on a large collection of neural units or neurons in a series of hidden layers or inner layers. Each hidden layer is made up of a set of neurons, where each neuron is connected to one or more neurons in the previous layer, and where neurons in a single layer can function completely independently and may not share any connections with other neurons of the layer. A neural network is self-learning and trained, rather than explicitly programmed. A convolutional neural network (CNN) is a neural network with one or more convolutional layers. A convolutional/deconvolutional layer has each neuron connected only to a local region in the previous layer spatially, but to the full depth (i.e. all color channels for an image).

Figure 5:
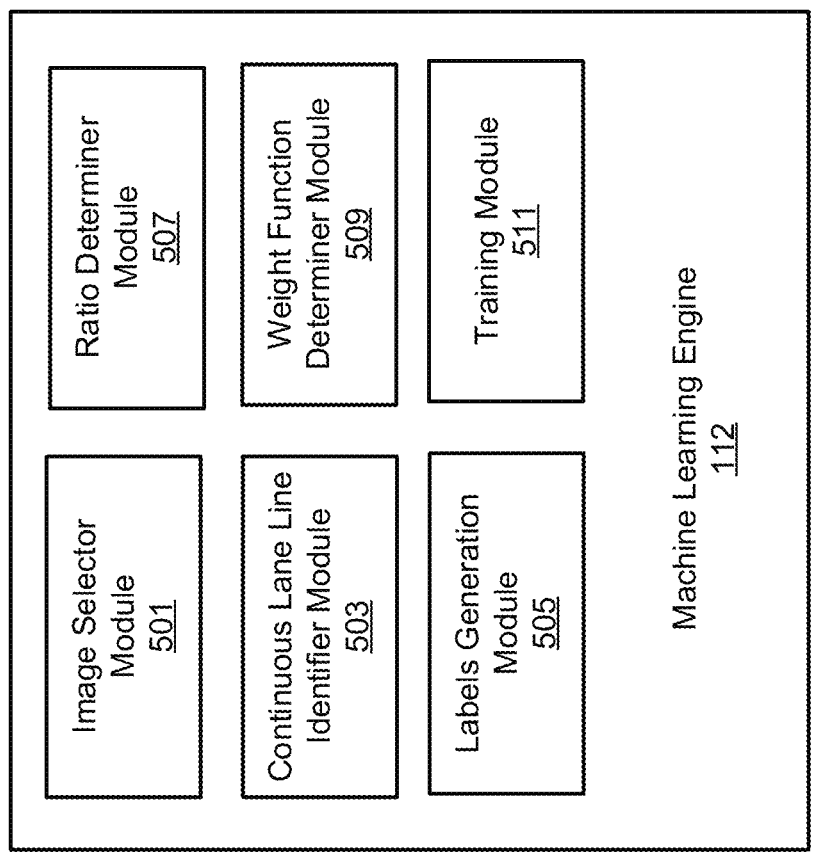
FIG. 5 is a block diagram illustrating an example of a machine learning engine according to one embodiment.

FIG. 5 is a block diagram illustrating an example of a machine learning engine according to one embodiment. Machine learning engine 112 can train a machine learning model. Examples of a machine learning model is a deep learning CNN. In one embodiment, machine learning engine 112 include image selector module 501, continuous lane lines identifier module 503, labels generation module 505, ratio determiner module 507, weighted function determiner module 509, and training module 511. Image selector 501 can select a set of images to be prepared to train a machine learning model. Continuous lane lines identifier module 503 can identify continuous lane lines in the images based on lane markers. Identifier module 503 can further fill in virtual (or pseudo) lane line markers to connect lane markers for a continuous lane line. Labels generation module 505 can generate one or more labels for the continuous lane lines. The labels along with the image can then be used as input data to train a machine learning model.

Ratio determiner module 507 can determine a ratio (or a percentage) of whole lane lines pixels for an image. The ratio can be determined based on a number of whole lane lines pixels to a total pixel count for a particular image. For example, an image with a 10% ratio would denote that 1/10 of pixels for the image contain continuous lane lines pixels (e.g., virtual or pseudo continuous lane lines), although painted dashed, dot, raised, or reflective lane markers in the image may have a pixel count less than the 10%. Weight function determiner module 509 can determine a weight function based on the continuous lane lines pixel ratio. Here, each image in an image set can have a different weight function. The weight function can then be applied in a weighted softmax cross-entropy loss for a deep learning CNN (e.g., a machine learning model). Training module 511 can then train the deep learning CNN using the weighted softmax function. Note, the image set (or dataset) may be images previously captured by the ADV or other similar vehicles, or training image datasets obtained from third party sources. Note, a softmax function or a normalized exponential function is typically used with the last layer of a CNN model to distribute a list of possible outcomes into a probability distribution for a prediction. Note, cross entropy loss is typically used as a measure of error between actual labels (desired outputs) and predicted or computed outputs during training. Although cross-entropy loss is discussed, other measures of error can be used, such as mean square error, etc.

Figure 6:
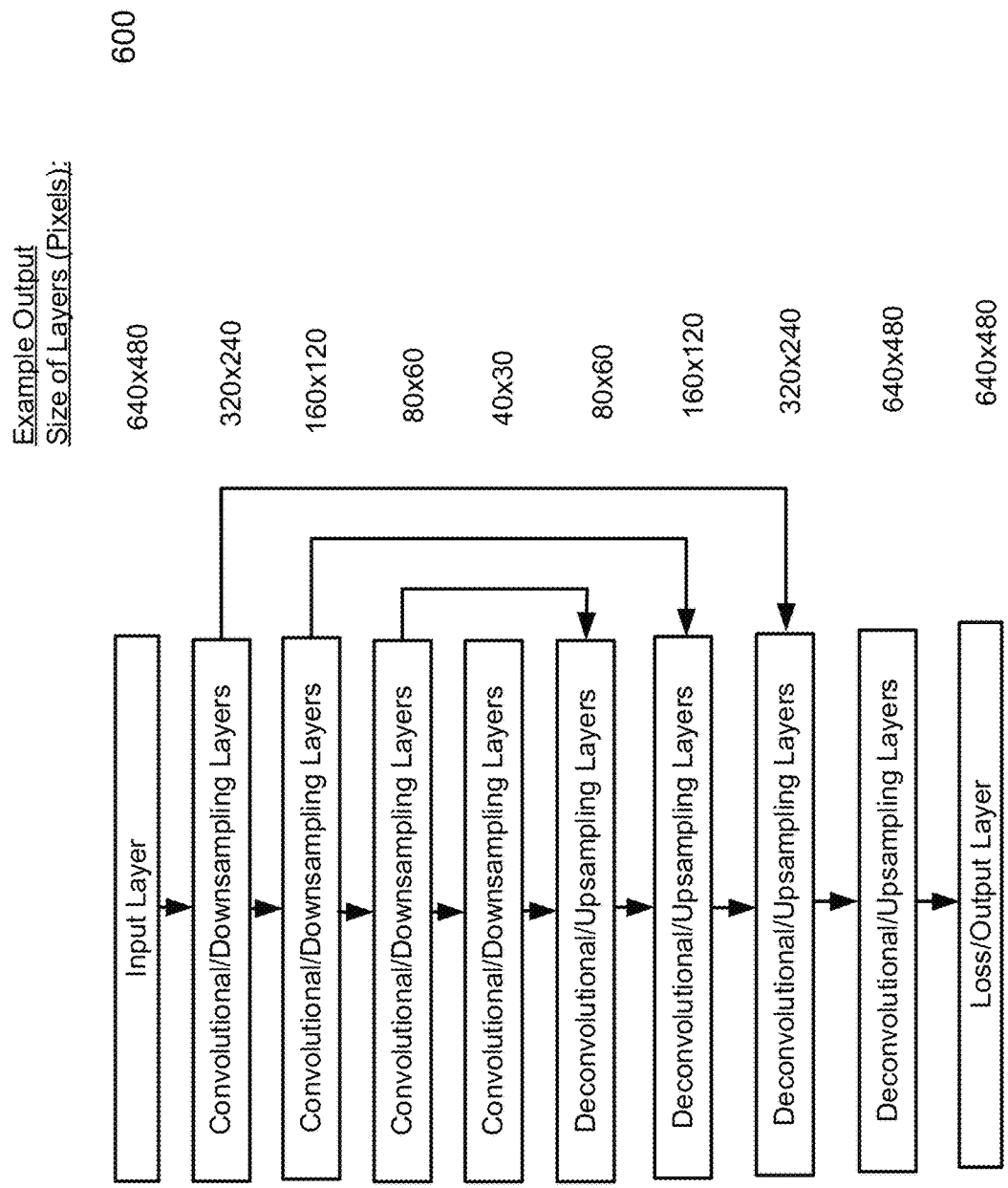
FIG. 6 illustrates an example of a convolutional neural network model for an ADV according to one embodiment.

FIG. 6 illustrates an example of a convolutional neural network model for an ADV according to one embodiment. Referring to FIG. 6, convolutional neural network (CNN) model 600 can be part of machine learning model 313 of FIG. 3A. CNN model 600 can be a deep neural network with an input layer, an output layer, and one or more hidden layers between the input and the output layers. In one embodiment, model 600 can include one or more convolutional layers and down-sampling layers as hidden layers. Convolutional layers apply a convolution operation to inputs to the layer and pass its results to the next layer. Convolutional layers can have parameters that include a set of learnable filters. The filters, or receptive field, of the convolutional layers can be any filters sizes, e.g., 5×5, 3×3, or 2×2, etc. that looks at only a small region in the input for different features. When the results are passed to the next layer, each neuron of the next layer, in effect, receives input from some number of locations in the previous layer based on the receptive fields, or filters. The convolution emulates the response of an individual neuron to visual stimuli. A down-sampling or pooling layer can follow one or more convolutional layers which combine the outputs of neuron clusters from a previous layer into a single neuron in the next layer, thus, reducing a spatial dimension of the image. In one embodiment, a down-sampling layer includes a max pooling layer that assigns a maximum value for each cluster of neurons from a prior layer. In another embodiment, a down-sampling layer includes an average pooling layer that assigns an average value for each cluster of neurons from a prior layer. The cluster of neurons is specified by a down-sampling size, e.g., 5×5, 3×3, or 2×2, etc.

Referring to FIG. 6, in one embodiment, model 600 can be applied to an image with a size of 640×480 pixels with 3 color channels (e.g., red-green-blue). Images initially captured by an image senor of the ADV may be different sizes and they may be cropped or resized to 640×480 pixels. The convolutional/down-sampling layers can then reduce a spatial dimension of the images to 320×240 pixels, 160×120 pixels, 80×60 pixels, and 40×30 pixels, respectively. The channel sizes can correspondingly be increased at each layer to keep a threshold of information about the image.

In another embodiment, model 600 can include one or more deconvolutional layers and up-sampling layers. A deconvolutional layer is equivalent to applying a backward pass for an image through CNN model 600. In one embodiment, passing an image through a deconvolutional layer applies a transpose deconvolution to the image. In another embodiment, a deconvolutional layer is applied to an image by adding zero paddings to the image and applying a convolution operation or a transpose convolution operation to the padded image. Deconvolution layer can then increase a spatial dimension of an image passing through the layer. In one embodiment, an up-sampling or unpooling layer follows one or more deconvolutional layer. In one embodiment, the up-sampling layer assigns a value from a prior layer to each cluster of neurons for a next layer. In another embodiment, the number of down-sampling layers equals the number of up-sampling layers.

Referring to FIG. 6, in one embodiment, model 600 can be applied to an output image having a size of 40×30 pixels at the convolution/down-sampling layers that is coupled next to the deconvolutional/up-sampling layers. The deconvolutional/up-sampling layers then increase a spatial dimension of the images to 80×60 pixels, 160×120 pixels, 320×240 pixels, then 640×480 pixels. The channel sizes can be decreased correspondingly at each layer. Note, the example CNN model 600 of FIG. 6 is for purposes of illustration. Any image sizes or number/combination of convolutional and deconvolutional layers can be used for the CNN model.

In some embodiments, the CNN model can include a skip architecture, e.g., different layers of the model include skip links or skip connections that connect (e.g., share) lower level features with higher level features for the different layers. For example, model 600 includes three skip connections for the convolutional/down-sampling layers with output images of sizes 320×240 pixels, 160×120 pixels, and 80×60 pixels, connected to their respective deconvolutional/up-sampling layers. Thus, feature information can be shared using the skip architecture.

In one embodiment, the output layer includes a loss layer with a loss or error function (e.g., cross entropy loss). In one embodiment, model 600 is trained with a weighted softmax cross-entropy loss. In one embodiment, the weighted softmax function is:

$$\frac{1}{\log(C+p)} * \text{softmax\_cross\_entropy\_loss},$$

where $$\frac{1}{\log(C+p)}$$

is a weight term, L is a constant, p is a probability value for the number of pixels of whole lane lines with respect to the total number of pixels of an image, and softmax cross entropy loss is a softmax cross-entropy loss. Here, the weight term is a probability indicator. Thus, model 600 can be trained with training images with a probability indicator indicating the number of pixels of whole lane lines for each of the images.

In one embodiment, the probability indicator for pixels count of whole lane lines with respect to the total pixels count of an image is determined based on a ratio of pixels of whole lane lines for each image of the training image set. The ratio for each image can be determined by 1) determining the regions having lane markers, 2) determining a number of complete (e.g., continuous) lane lines corresponding to the regions of lane markers, 3) connecting the lane markers to complete each of the whole lane lines (e.g., generated labels for the training image), and 4) determining the pixel counts in the image for the completed whole lane lines. The pixel counts for complete whole lane lines for the image would be used to calculate the ratio. In some embodiments, all complete lane lines are categorized as single solid lane lines. E.g., double solid lines, single dashed lane lines, and solid/dashed combination lane lines can be categorized as a single solid lane line. Once a ratio is determined, the image, its labels and the ratio can then be used as a training data (among the training data for other images) to train a CNN model.

During real-time prediction, model 600 can predict complete solid lane lines based on images capturing an area surrounding the ADV captured by an image sensor of the ADV (e.g., camera), with or without other vehicles obstructing a view of the image sensor, as long as the image sensor captures a surrounding having at least a portion of lane markers for model 600 to infer a corresponding continuous lane line. In some embodiments, model 600 performs predictions with other machine learning models, since lone single solid lane lines, as predicted, would not indicate a direction of traffic flow nor whether is it safe for the ADV to change lanes, where the other machine learning models can predict obstacles, directions of moving traffic, etc. In another embodiment, model 600 can be combined with other machine learning models (e.g., models for object detections/image classifications, etc.), such that these models can be co-trained to reduce a time for training. Furthermore, one inference pass for an input image can infer both continuous lane lines and other objects/markers by applying such as combined model.

Figure 7:
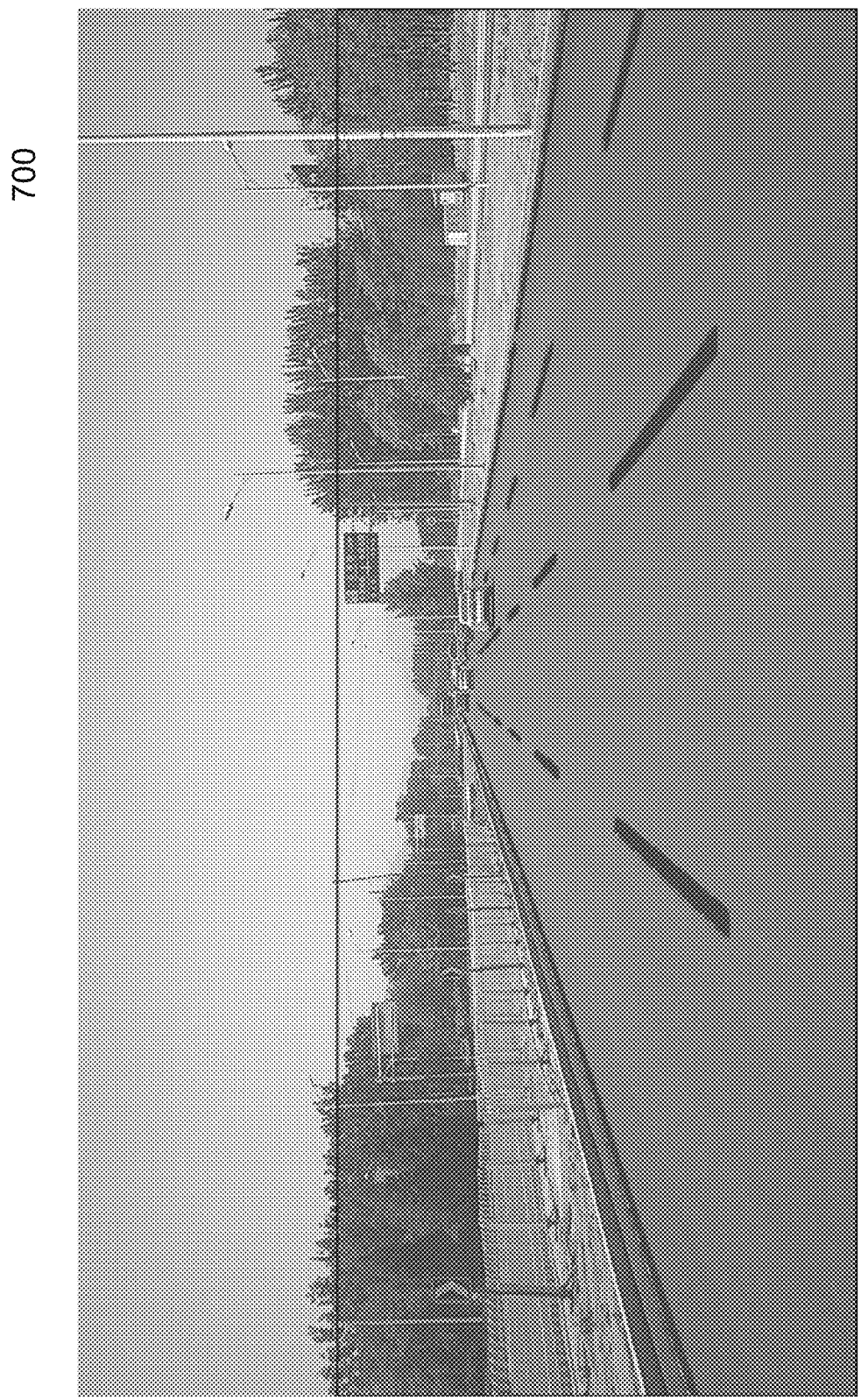
FIG. 7 illustrates an example of a perspective view of an ADV according to one embodiment.

FIG. 7 illustrates an example of a perspective view of an ADV according to one embodiment. According to perspective view image 700, as captured by an image sensor such as a camera mounted on an ADV, the ADV is situated in one lane of a four lane roadway. The four lane roadway is bounded by road curb or barriers at a left and a right side of the roadway. Each of the four lanes is separated by a left and a right dashed lane lines markers, e.g., three columns (or groups) of dashed lane lines markers. In general, a single solid line means a lane change is discourage, a double solid line means a lane change is prohibited from both a left and a right direction, a combination of a solid with dashed line means passing is allowed only from one direction, and a single dashed lane lines that means passing or lane change is allowed. The perspective view image (e.g., RGB image) 700 may be transmitted to lane lines detection module 308. Lane lines detection module 308 then apply a machine learning model (such as model 600 of FIG. 6) to the perspective view (e.g., RGB image) to detect one or more continuous (whole or solid) lane lines from a roadway with a mixture/combination of single solid lines, double solid lines, solid/dashed line, and dashed lines, etc.

Figure 8:
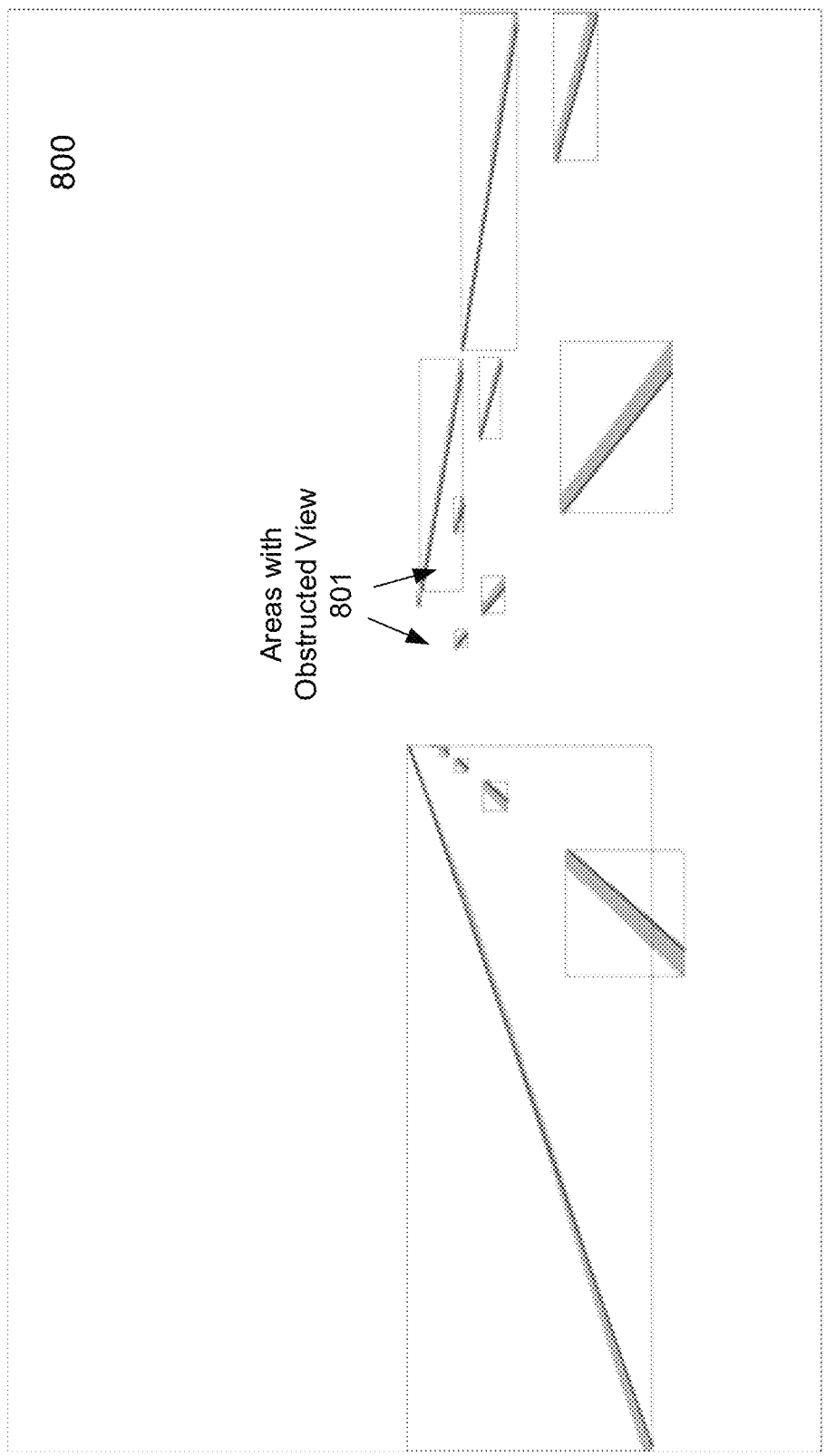
FIG. 8 illustrates an example of a conventional detection output for dashed lane markers for the perspective view of FIG. 7.

FIG. 8 illustrate an example of a conventional detection output for dashed lane markers (e.g., broken lines) for the perspective view of FIG. 7. Referring to FIG. 8, image 800 includes one or more dashed lane markers detections using a conventional image segmentation method. Image 800 includes two single solid lane lines for the left and the right boundaries of the roadway. Each of the four lanes is separated by broken or dashed lane lines. Here, each dashed lane marker of a dashed lane line is detected independent of other markers. When a portion of a view is being obstructed by other vehicles on the roadway (e.g., areas with obstructed view 801), some dash lane markers in the obstructed view may not be detected at the detection output.

Figure 9:
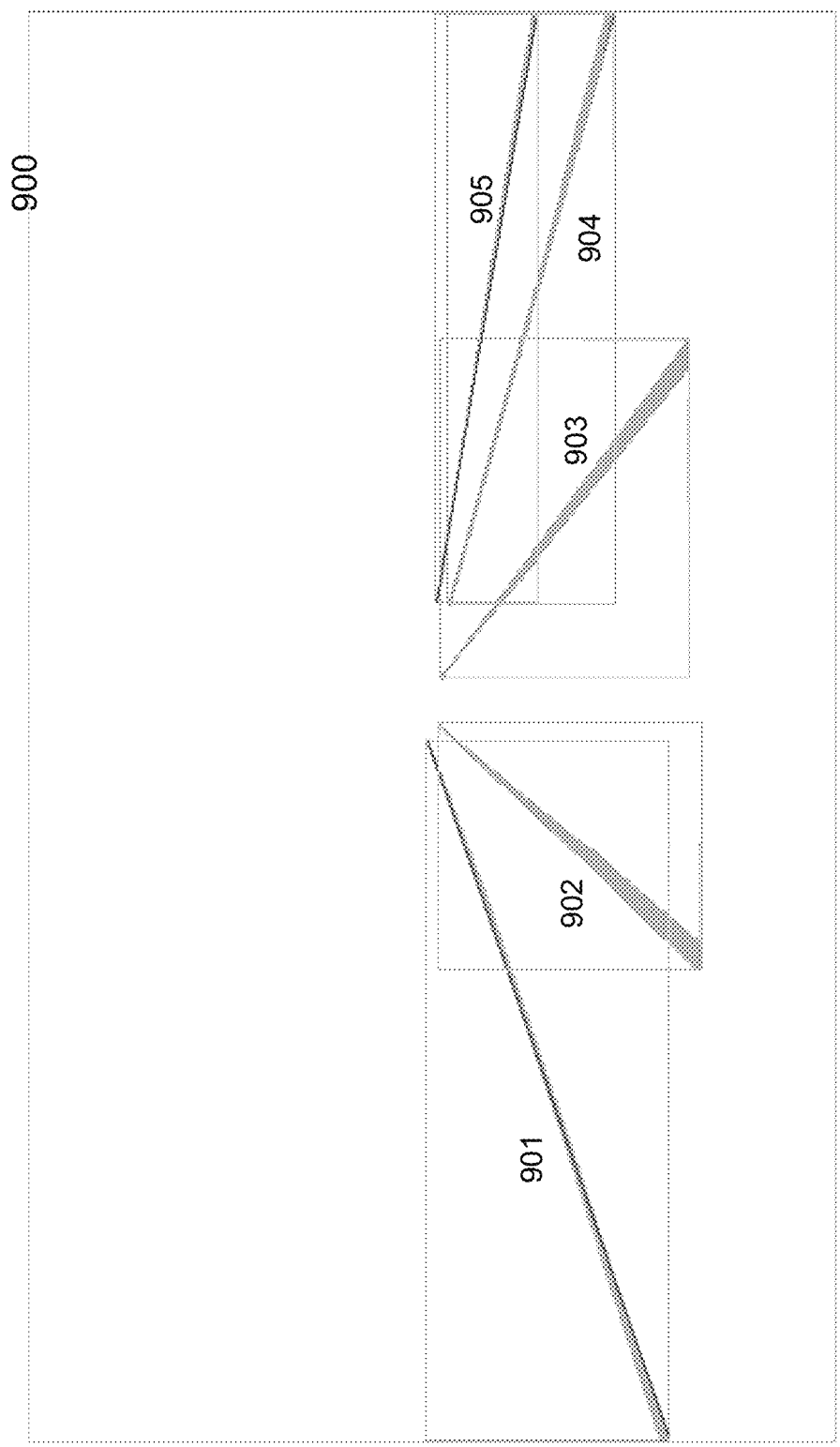
FIG. 9 illustrates an example of an inference output for continuous (e.g., whole) lane lines for the perspective view of FIG. 7 according to one embodiment.

FIG. 9 illustrates an example of an inference output for continuous (e.g., whole) lane lines for the example perspective view of FIG. 7. Referring to FIG. 9, image 900 is inferred from image 700 of FIG. 7 by applying a machine learning model, such as model 600 of FIG. 6, to image 700. Image 900 includes single continuous lane lines 901-905. In comparison with image 800 of FIG. 8, image 900 has no dashed lane lines, but connected continuous lane lines, e.g., lane lines 901-905. Note, even if vehicles surrounding the ADV obstruct a portion of its view (e.g., some dashed lane markers are missing), there is a high probability model 600 can infer the missing dashed lane markers and thus still infer solid continuous lane lines with only a portion of dashed lane markers.

Figure 10:
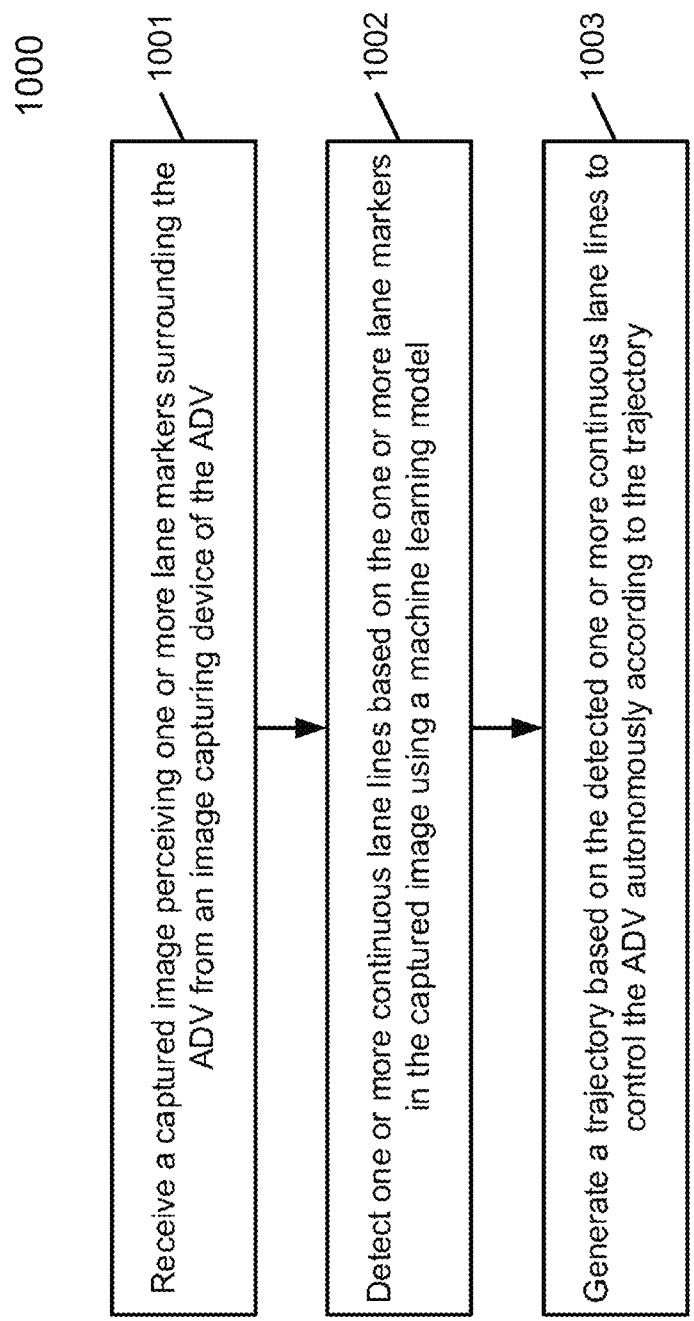
FIG. 10 is a flow diagram illustrating a method according to one embodiment.

FIG. 10 is a flow diagram illustrating a method according to one embodiment. Processing 1000 may be performed by processing logic which may include software, hardware, or a combination thereof. For example, process 1000 may be performed by lane lines detection module 308 of FIG. 3A. Referring to FIG. 10, at block 1001, processing logic receives a captured image perceiving one or more dashed lane markers surrounding the ADV from an image capturing device of the ADV. At block 1002, processing logic detects one or more continuous lane lines based on the dashed lane markers in the captured image by applying a machine learning model to the captured image, where the machine learning model includes a number of layers of nodes and the machine learning model is trained with a weighted softmax with cross-entropy loss within at least one of the layers. At block 1003, processing logic generates a trajectory based on the one or more continuous lane lines to control the ADV autonomously according to the trajectory.

In one embodiment, the machine learning model includes a convolutional neural network (CNN) model. In another embodiment, the CNN model includes a plurality of convolutional layers and a plurality of deconvolutional layers. In another embodiment, the CNN model includes a number of down-sampling layers and a number of up-sampling layers, wherein the number of the down-sampling layers equal the number of the deconvolutional layers.

In one embodiment, the weighted softmax with cross-entropy loss is at an output layer of the machine learning model. In another embodiment, the weighted softmax with cross-entropy loss includes a weighting function and a weight of the weighting function is unique for each training image. In another embodiment the weight of the weighting function is determined based on a ratio of a pixels count of the continuous lane lines to a total pixels count of each training image.

Figure 11:
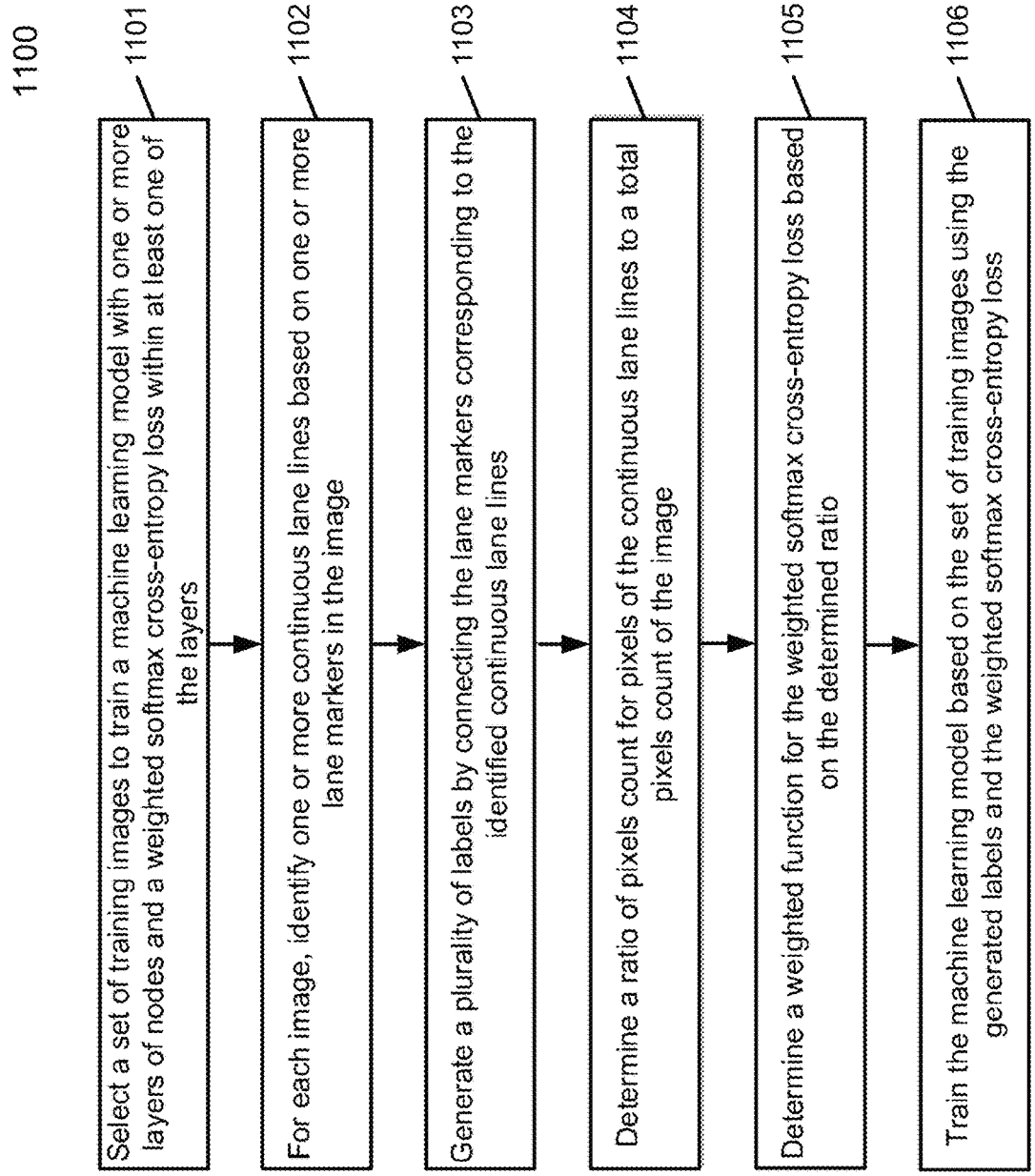
FIG. 11 is a flow diagram illustrating a method according to one embodiment.

FIG. 11 is a flow diagram illustrating a method according to one embodiment. Processing 1100 may be performed by processing logic which may include software, hardware, or a combination thereof. For example, process 1100 may be performed by machine learning engine 112 of FIG. 5. Referring to FIG. 11, at block 1101, processing logic selects a set of training images to train the machine learning model, wherein the machine learning model includes a plurality of layers of nodes. For each of the training images, at block 1102, processing logic identifies one or more continuous lane lines based on one or more lane markers in the image. At block 1103, processing logic generates a number of labels by connecting the lane markers corresponding to the identified continuous lane lines. At block 1104, processing logic determines a ratio of pixels count for pixels of the continuous lane lines to a total pixels count of the image. At block 1105, processing logic determines a weighted softmax cross-entropy loss within at least one of the layers of the machine learning model based on the determined ratio. At block 1106, processing logic trains the machine learning model based on the set of training images using the generated labels and the weighted softmax cross-entropy loss, where the trained machine learning model is applied to an image perceiving an environment surrounding the ADV captured by an image capturing device of the ADV to identify one or more continuous lane lines based on lane markers captured in the image, where the continuous lane lines are used to generate a trajectory to control the ADV autonomously according to the trajectory.

In one embodiment, the machine learning model includes a convolutional neural network (CNN) model. In another embodiment, the CNN model includes a plurality of convolutional layers and a plurality of deconvolutional layers. In another embodiment, the CNN model includes a number of down-sampling and up-sampling layers and the number of down-sampling layers equals the number of up-sampling layers.

In one embodiment, the weighted softmax cross-entropy loss is at an output layer of the machine learning model. In another embodiment, the weighted softmax cross-entropy loss includes a weighting function and a weight of the weighting function is unique for each training image. In another embodiment, the weight of the weighting function is determined based on a ratio of a pixels count of continuous lane lines to a total pixels count of each training image.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 12:
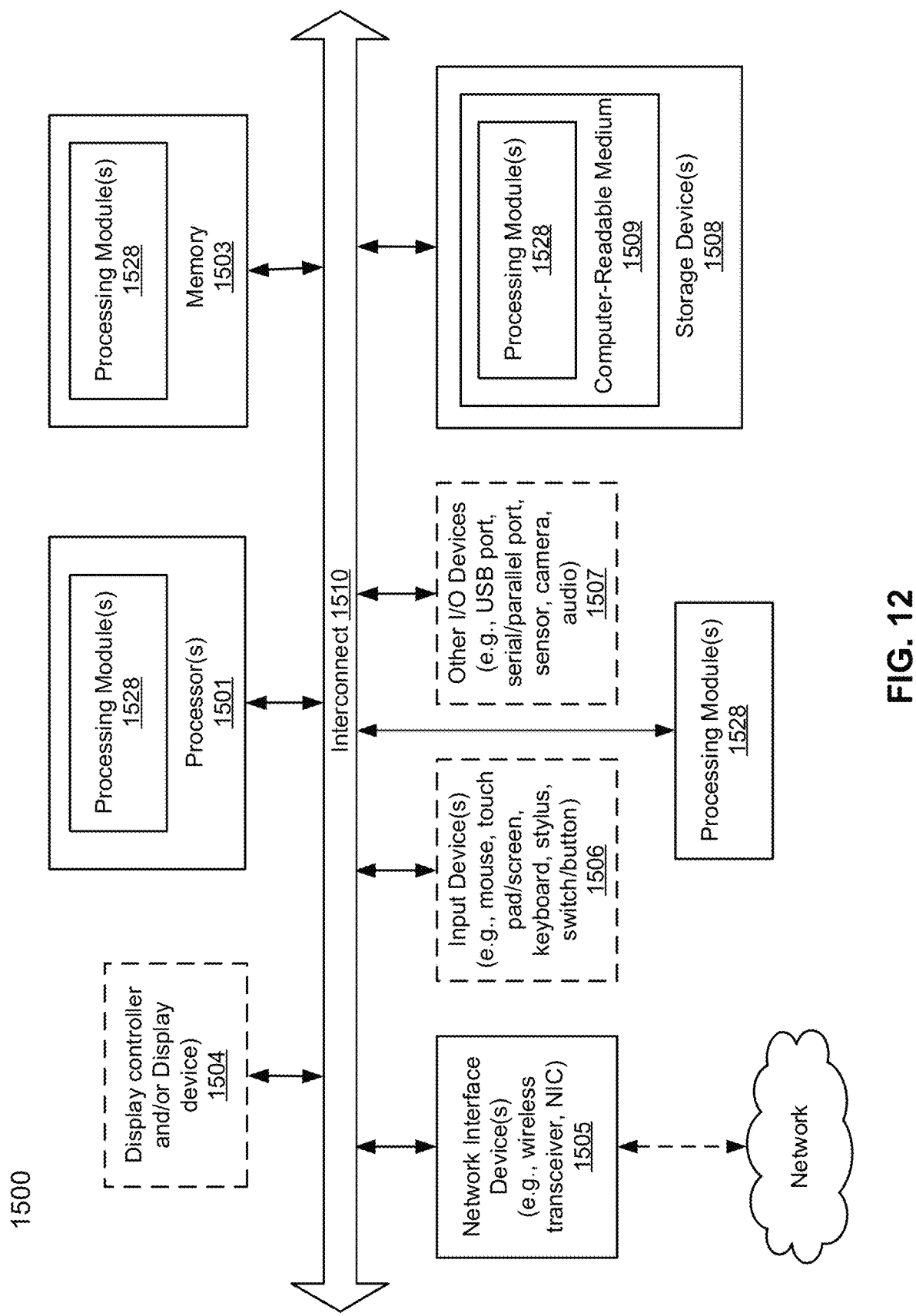
FIG. 12 is a block diagram illustrating a data processing system according to one embodiment.

FIG. 12 is a block diagram illustrating an example of a data processing system which may be used with one embodiment of the disclosure. For example, system 1500 may represent any of data processing systems described above performing any of the processes or methods described above, such as, for example, perception and planning system 110 or servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, lane lines detection module 308 of FIG. 3A or machine learning engine 112 of FIG. 5. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to generate a driving trajectory for an autonomous driving vehicle (ADV), the method comprising:

receiving a captured image perceiving one or more segmented lane markers surrounding the ADV from an image capturing device of the ADV;

generating one or more continuous lane lines in the captured image by connecting the one or more segmented lane markers in the captured image;

identifying the one or more continuous lane lines representing boundaries of lanes having the segmented lane markers in the captured image by applying a machine learning model to the captured image, wherein the machine learning model includes a plurality of layers of nodes and the machine learning model includes a weighted softmax with cross-entropy loss within at least one of the layers in training, wherein the weighted softmax with cross-entropy is at an output layer of the machine learning model and includes a weighting function determined based on a ratio of a pixels count of the one or more continuous lane lines to a total pixels count of the image, and wherein a weight of the weighting function is unique for each image; and generating a trajectory based on the one or more continuous lane lines to control the ADV autonomously according to the trajectory.

2. The method of claim 1, wherein the machine learning model includes a convolutional neural network (CNN) model.

3. The method of claim 2, wherein the CNN model includes a plurality of convolutional layers and a plurality of deconvolutional layers.

4. The method of claim 3, wherein the CNN model includes a number of down-sampling and up-sampling layers and the number of down-sampling layers equals the number of up-sampling layers.

5. The method of claim 1, wherein the segmented lane markers in the captured image comprises dashed, dot, raised, or reflective lane markers in the captured image.

6. The method of claim 1, further comprising:

determining regions of the captured image having lane markers;

determining a number of whole lane lines corresponding to the regions of the captured image having lane markers;

connecting the lane markers to complete each of the whole lane lines; and determining the pixels count in the captured image for the completed whole lane lines.

7. A non-transitory machine-readable medium having instructions stored therein, which when executed by a processor, cause the processor to perform operations, the operations comprising:

receiving a captured image perceiving one or more segmented lane markers surrounding an autonomous driving vehicle (ADV) from an image capturing device of the ADV;

generating one or more continuous lane lines in the captured image by connecting the one or more segmented lane markers in the captured image;

identifying the one or more continuous lane lines representing boundaries of lanes having the segmented lane markers in the captured image by applying a machine learning model to the captured image, wherein the machine learning model includes a plurality of layers of nodes and the machine learning model includes a weighted softmax cross-entropy loss within at least one of the layers in training, wherein the weighted softmax with cross-entropy is at an output layer of the machine learning model and includes a weighting function determined based on a ratio of a pixels count of the one or more continuous lane lines to a total pixels count of the image, and wherein a weight of the weighting function is unique for each image; and generating a trajectory based on the one or more continuous lane lines to control the ADV autonomously according to the trajectory.

8. The non-transitory machine-readable medium of claim 7, wherein the machine learning model includes a convolutional neural network (CNN) model.

9. The non-transitory machine-readable medium of claim 8, wherein the CNN model includes a plurality of convolutional layers and a plurality of deconvolutional layers.

10. The non-transitory machine-readable medium of claim 9, wherein the CNN model includes a number of down-sampling and up-sampling layers and the number of down-sampling layers equals the number of up-sampling layers.

11. The non-transitory machine-readable medium of claim 7, wherein the segmented lane markers in the captured image comprises dashed, dot, raised, or reflective lane markers in the captured image.

12. The non-transitory machine-readable medium of claim 7, the operations further comprising:

determining regions of the captured image having lane markers;

determining a number of complete lane lines corresponding to the regions of the captured image having lane markers;

connecting the lane markers to complete each of the whole lane lines; and determining the pixels count in the captured image for the completed whole lane lines.

13. A computer-implemented method to train a machine learning model for an autonomous driving vehicle (ADV), the method comprising:

selecting a set of training images to train the machine learning model, wherein the machine learning model includes a plurality of layers of nodes and a weighted softmax cross-entropy loss within at least one of the layers;

for each of the training images, identifying one or more continuous lane lines based on one or more lane markers in the image;

generating a plurality of labels by connecting the lane markers corresponding to the identified continuous lane lines;

determining a ratio of pixels count for pixels of the continuous lane lines to a total pixel count of the image;

determining a weighting function for the weighted softmax cross-entropy loss based on the determined ratio; and training a machine learning model based on the set of training images using the generated labels and the weighted softmax cross-entropy loss, wherein the trained machine learning model is applied to an image perceiving an environment surrounding the ADV captured by an image capturing device of the ADV to identify one or more continuous lane lines based on the lane markers captured in the image, wherein the continuous lane lines are used to generate a trajectory to control the ADV autonomously according to the trajectory.

14. The method of claim 13, wherein the machine learning model includes a convolutional neural network (CNN) model.

15. The method of claim 14, wherein the CNN model includes a plurality of convolutional layers and a plurality of deconvolutional layers.

16. The method of claim 15, wherein the CNN model includes a number of down-sampling and up-sampling layers and the number of down-sampling layers equals the number of up-sampling layers.

17. The method of claim 13, wherein the weighted softmax cross-entropy loss is at an output layer of the machine learning model.

18. The method of claim 17, wherein a weight of the weighting function is unique for each training image.

19. The method of claim 18, wherein the weight of the weighting function is determined based on a ratio of a pixels count of continuous lane markers to a total pixels count of each training image.

20. The method of claim 13, wherein at least one of the continuous lane lines comprises dashed, dot, raised, or reflective lane markers in the captured image.

* * * * *